(12) United States Patent
Nicastro

(10) Patent No.: US 7,561,940 B2
(45) Date of Patent: Jul. 14, 2009

(54) METHOD FOR PREDICTIVE MAINTENANCE OF A CUTTING UNIT OF AN AUTOMATIC MACHINE

(75) Inventor: Francesco Nicastro, Imola (IT)

(73) Assignee: G.D. Societa' per Azioni (IT)

( * ) Notice: Subject to any disclaimer, the term of this patent is extended or adjusted under 35 U.S.C. 154(b) by 0 days.

(21) Appl. No.: 10/580,526

(22) PCT Filed: Nov. 23, 2004

(86) PCT No.: PCT/EP2004/053055

§ 371 (c)(1),
(2), (4) Date: Mar. 30, 2007

(87) PCT Pub. No.: WO2005/051616

PCT Pub. Date: Jun. 9, 2005

(65) Prior Publication Data

US 2007/0173969 A1     Jul. 26, 2007

(30) Foreign Application Priority Data

Nov. 24, 2003    (IT)    ........................... BO2003A0708

(51) Int. Cl.
G06F 19/00    (2006.01)
(52) U.S. Cl. ................... 700/177; 700/108; 700/174; 700/175; 702/184
(58) Field of Classification Search ............ 700/14–16, 700/108–110, 122, 124, 125, 127, 174, 175, 700/177; 702/184
See application file for complete search history.

(56) References Cited

U.S. PATENT DOCUMENTS

| | | | | |
|---|---|---|---|---|
| 4,031,368 A | * | 6/1977 | Colding et al. ............. | 700/173 |
| 4,943,341 A | | 7/1990 | Mattei ........................ | 83/341 |
| 5,010,491 A | * | 4/1991 | Biasillo et al. ............. | 700/186 |
| 5,587,925 A | * | 12/1996 | Li ............................... | 702/113 |
| 5,780,725 A | | 7/1998 | Tanaka ........................ | 73/104 |
| 5,880,965 A | * | 3/1999 | Nakamura et al. .......... | 700/175 |
| 6,247,388 B1 | | 6/2001 | Carter et al. .................... | 83/13 |
| 6,389,941 B1 | | 5/2002 | Michler ........................ | 83/74 |
| 2003/0015076 A1 | | 1/2003 | Tanaka et al. .................. | 83/72 |
| 2003/0126963 A1 | | 7/2003 | Davis, II et al. ................ | 83/13 |

FOREIGN PATENT DOCUMENTS

| | | |
|---|---|---|
| DE | 100 21 614 A1 | 11/2004 |
| EP | 0 654 329 A1 | 5/1995 |
| EP | 0 707 928 A1 | 4/1996 |
| EP | 1 162 029 A1 | 12/2001 |
| WO | WO 99/58306 | 11/1999 |
| WO | WO 02/39199 A1 | 5/2002 |

OTHER PUBLICATIONS

International search Report PCT/EP2004/053055 dated Feb. 24, 2005.

* cited by examiner

*Primary Examiner*—Sean P Shechtman
(74) *Attorney, Agent, or Firm*—Ostrolenk, Faber, Gerb & Soffen, LLP

(57) ABSTRACT

A method for predictive maintenance of a cutting unit of an automatic machine; the method determining, with a given frequency, the value of a characteristic quantity of the cutting unit related to contact between a cutting member and a counter-member; determining a curve for extrapolating the time pattern of the characteristic quantity value, and programming maintenance work on the cutting unit when the curve is outside a given acceptance range.

45 Claims, 2 Drawing Sheets

METHOD FOR PREDICTIVE MAINTENANCE OF A CUTTING UNIT OF AN AUTOMATIC MACHINE

CROSS REFERENCE TO RELATED APPLICATION

The present application is a 35 U.S.C. §§371 national phase conversion of PCT/EP2004/053055, filed 23 Nov. 2004, which claims priority of Italian Patent Application No. BO2003A 000708, filed 24 Nov. 2003, which is herein incorporated by reference. The PCT International Application was published in the English language.

TECHNICAL FIELD

The present invention relates to a method for predictive maintenance of a cutting unit of an automatic machine.

BACKGROUND ART

Automatic machines frequently comprise a cutting unit for cutting a continuous, reel-fed strip into individually used portions.

One example of a cutting unit employed on an automatic machine is described in Patent EP-0654329-B1, which describes a cutting unit for cutting a conveyor-fed strip into portions. The cutting unit comprises a number of inner blades with respective cutting edges parallel to one surface of the strip, and corresponding outer blades with respective cutting edges sloping with respect to those of the inner blades. Each inner blade moves with the conveyor through the cutting station in time with the corresponding outer blade, is gradually moved through the conveyor into a cutting position, and is gradually engaged by the sloping cutting edge of the corresponding outer blade to scissor-cut the strip.

Another example of a cutting unit employed on an automatic machine is described in U.S. Pat. No. 4,943,341-A1, which describes a cutting unit for cutting bands successively off a strip by means of two cutting drums fitted with a number of blades; each blade on one drum defines, with a blade on the other drum, a pair of scissors for cutting the strip at successive points as the drums rotate.

Another example of a cutting unit employed on an automatic machine is described in U.S. Pat. No. 4,943,341-A1, which describes a cutting unit for cutting filter-cigarette bands on a high-speed filter assembly machine; the bands are cut successively off a strip by two counter-rotating cutting drums, each fitted with a number of equally spaced blades; and each blade on one drum defines, with a blade on the other drum, scissor means by which to cut the strip at successive points as the drums rotate.

During normal operation of a cutting unit of the type described above, mutual contact of the blades tends to wear them down and so eventually impair efficiency, which results in a gradual increase in the number of rejects and in jamming of the machine caused by cutting problems. For this reason, an operator adjusts the cutting unit at predetermined intervals, and, after another predetermined interval or predetermined number of adjustments, the cutting unit is dismantled for overall servicing.

Using the above maintenance method, however, the number of rejects and the extent to which the machine is subject to jamming caused by cutting problems still remain, on average, serious considerations, or the working life of the cutting unit is particularly short, depending on the length of the set adjustment intervals. Determining the best length of set adjustment intervals has always proved complicated on account of dispersion and drift in the construction and operating characteristics of different cutting units. Moreover, the best length is seriously affected by the characteristics of the strip being cut, and is therefore substantially impossible to determine when the type of strip used on the automatic machine is changed frequently.

DISCLOSURE OF INVENTION

It is an object of the present invention to provide a method for predictive maintenance of a cutting unit on an automatic machine, designed to eliminate the aforementioned drawbacks, and which, in particular, is cheap and easy to implement.

According to the present invention, there is provided a method for predictive maintenance of a cutting unit of an automatic machine, as claimed in claim 1 and, preferably, in any one of the following claims depending directly or indirectly on claim 1.

BRIEF DESCRIPTION OF THE DRAWINGS

A number of non-limiting embodiments of the present invention will be described by way of example with reference to the accompanying drawings, in which.

BEST MODE FOR CARRYING OUT THE INVENTION

Figure 1:
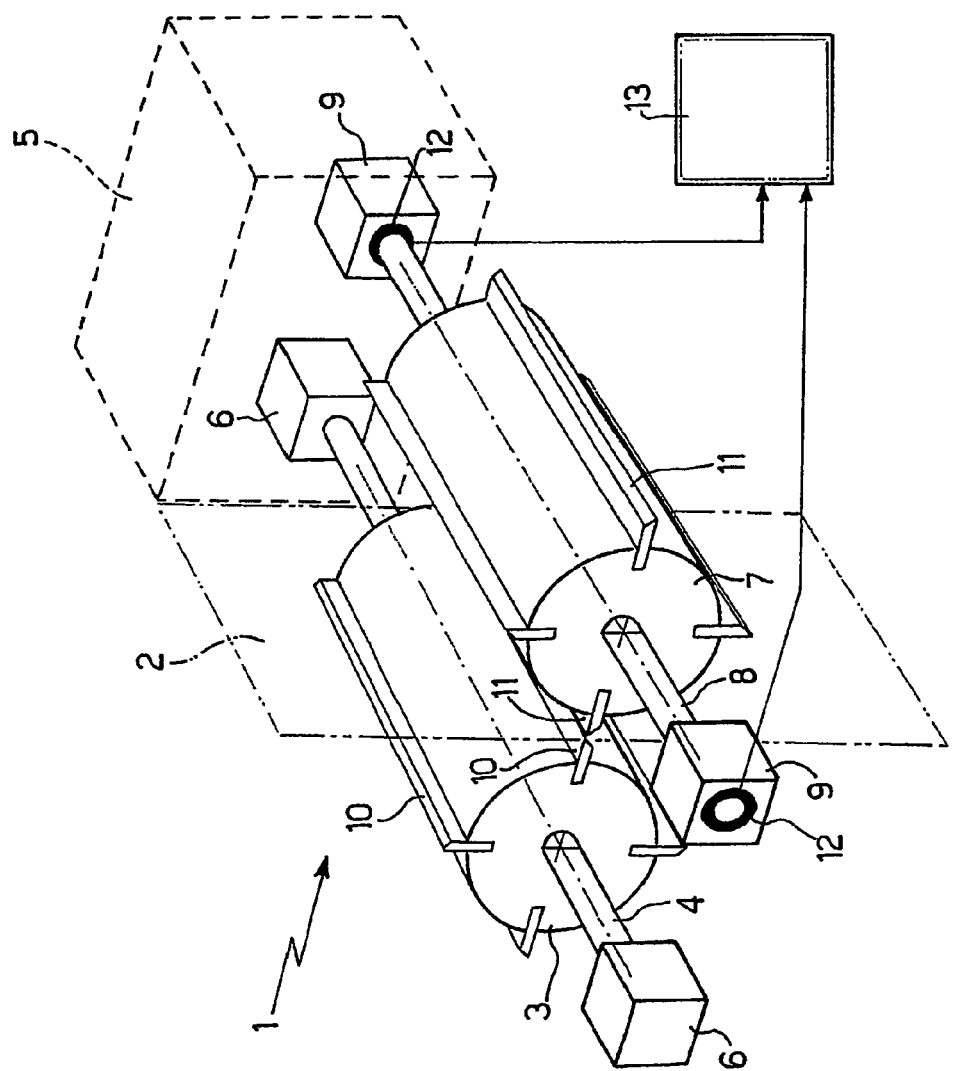
FIG. 1 shows a schematic view in perspective of a cutting unit of an automatic machine, to which the predictive maintenance method according to the present invention is applied.

With reference to FIG. 1, number 1 indicates as a whole a cutting unit for cutting a strip 2 of paper on an automatic machine (not shown). More specifically, strip 2 of paper is unwound off a reel (not shown) and fed through cutting unit 1 by a known feed device (not shown in detail) to be cut into a succession of portions of equal length.

Cutting unit 1 comprises a drum 3 fitted to a shaft 4 mounted for rotation and rotated continuously, in use, by an actuating device 5; and shaft 4 is fitted to a frame of the automatic machine via the interposition of two bearings 6. Cutting unit 1 also comprises a drum 7 facing and parallel to drum 3 and fitted to a shaft 8 mounted for rotation and rotated continuously, in use, by actuating device 5; and shaft 8 is fitted to the frame of the automatic machine via the interposition of two bearings 9.

Drum 3 supports a number of blades 10 equally spaced on the lateral surface of drum 3; and, similarly, drum 7 supports a number of blades 11 equally spaced on the lateral surface of drum 7. In use, strip 2 of paper is fed between drums 3 and 7, and is cut cyclically by the combined action of one blade 10 on drum 3 and a corresponding blade 11 on drum 7. In other words, each blade 10 on drum 3 acts as a cutting member, and the corresponding blade 11 on drum 7 acts as a counter-member.

In the embodiment shown, each blade 10 on drum 3 and the corresponding blade 11 on drum 7 cooperate end to end to nip the strip; in an alternative embodiment not shown, each blade 10 on drum 3 and the corresponding blade 11 on drum 7 slide one alongside the other to scissor-cut the strip; in a further embodiment not shown, drum 7 has no blades, and the lateral surface of drum 7 acts as a cutting surface for blades 10 on drum 3; and, in a further embodiment not shown, drum 7 is replaced by a fixed cutting surface for blades 10 on drum 3.

Bearings 9 of drum 7 are fitted with respective sensors 12 for detecting vibration produced by shaft 8 on bearings 9, and which are connected to a control unit 13. Further sensors 12 may also be fitted to bearings 6 of drum 3.

In actual use, control unit 13 determines the time pattern of the vibration produced by contact between blades 10 and 11, and, by processing the time pattern of the vibration produced by contact between blades 10 and 11, estimates the energy produced by contact between blades 10 and 11. In a preferred embodiment, the energy produced by contact between blades 10 and 11 is used as a characteristic quantity of cutting unit 1, by which to program maintenance of cutting unit 1.

In an alternative embodiment, the characteristic quantity by which to program maintenance of cutting unit 1 is the force with which blades 10 contact blades 11; in a further alternative embodiment, the characteristic quantity by which to program maintenance of cutting unit 1 is a measurement of the vibration produced by contact between blades 10 and 11; and, in further embodiments, the characteristic quantity by which to program maintenance of cutting unit 1 is the stress, pressure, impact, or acceleration with which blades 10 contact blades 11.

Figure 2:
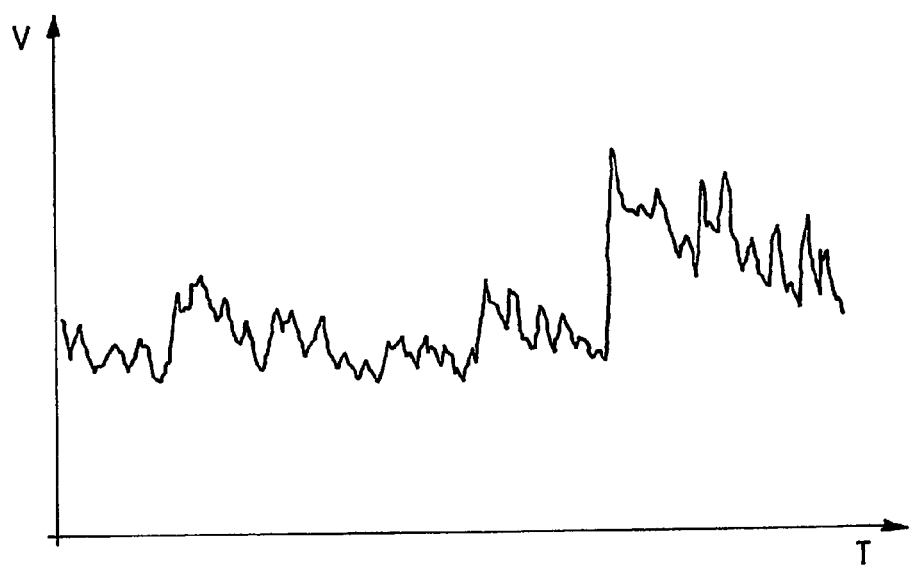
FIG. 2 shows a time graph of characteristic values of the FIG. 1 cutting unit.
Figure 3:
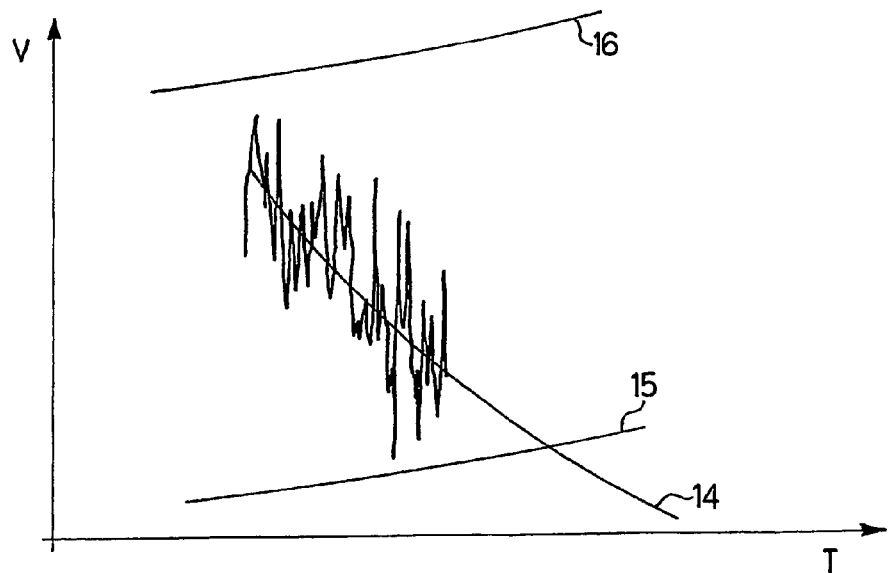
FIG. 3 shows a graph illustrating processing of a portion of the FIG. 2 graph.

During normal operation of cutting unit 1, control unit 13 determines the value V of the characteristic quantity with a given frequency, e.g. for 10 seconds every 10 minutes' operation of cutting unit 1. FIG. 2 shows a graph of time along the x axis, and the characteristic quantity value V as a function of time along the y axis. As can be seen, the characteristic quantity value V has an oscillating pattern which decreases between a maximum value, recorded just after maintenance work on cutting unit 1, and a minimum value, recorded just before maintenance work on cutting unit 1. More specifically, at the maintenance work point, characteristic quantity value V undergoes a step increase.

By mathematically processing, in known manner, the succession of characteristic quantity values V recorded since the last maintenance work on cutting unit 1, control unit 13 determines an exponential curve 14 which decreases with time and extrapolates the time pattern of characteristic quantity value V; and, once curve 14 is determined, control unit 13 programs subsequent maintenance work on cutting unit 1 the instant curve 14 moves outside a given acceptance range.

In the succession of characteristic quantity values V, the instant in which maintenance work has been carried out on cutting unit 1 is indicated by a step (i.e. a sharp change) in the characteristic quantity value V pattern. In other words, maintenance work performed on cutting unit 1 is indicated by a step, of a value greater than a given threshold value, in the characteristic quantity value V pattern.

More specifically, the acceptance range comprises a time-variable lower limit defined by an exponential curve 15 increasing with time; and a time-variable upper limit defined by an exponential curve 16 also increasing with time. If curve 14 is above curve 16 or below curve 15 immediately following maintenance of cutting unit 1, this means either the maintenance work has not be carried out properly, or that blades 10 and 11 of cutting unit 1 need changing, as opposed to maintenance (adjustment). In other words, the distance between curve 14 and curves 15 and 16, immediately following maintenance of cutting unit 1, indicates when blades 10 and 11 need changing as opposed to adjusting. Tests show the most significant parameter indicating when blades 10 and 11 need changing, as opposed to adjusting, to be the distance between curve 14 and curve 15 immediately following maintenance of cutting unit 1.

Exponential curve 15 may be determined theoretically or experimentally. More specifically, curve 15 is determined experimentally as the curve which best interpolates the set of relative minimum points of characteristic quantity value V recorded just before maintenance of cutting unit 1. In other words, a very long series of characteristic quantity values V of a test cutting unit 1 is determined; and curve 15 is determined considering only the relative minimum points of the characteristic quantity value V recorded just before maintenance of cutting unit 1.

Like exponential curve 15, exponential curve 16 may also be determined theoretically or experimentally. More specifically, curve 16 is determined experimentally as the curve which best interpolates the set of relative maximum points of characteristic quantity value V recorded just after maintenance of cutting unit 1.

In a preferred embodiment, control unit 13 provides for compensating the measured characteristic quantity values V as a function of environmental conditions. More specifically, control unit 13 is connected to a known temperature sensor (not shown) for determining the operating temperature of cutting unit 1, and compensates the measured characteristic quantity values V accordingly. In fact, as a result of thermal expansion, and mechanical characteristics being equal, the energy produced by contact between blades 10 and 11 also increases or decreases as a function of construction characteristics alongside an increase in the operating temperature of cutting unit 1. Control unit 13 may also provide for compensating the measured characteristic quantity values V as a function of the operating speed of cutting unit 1. In fact, mechanical characteristics being equal, the energy produced by contact between blades 10 and 11 has also been found to increase alongside an increase in the operating speed of cutting unit 1.

Control unit 13 preferably real-time determines certain operating characteristics of cutting unit 1 to determine any damage to the mechanical parts of cutting unit 1. For example, control unit 13 may determine the maximum vibration value in bearings 6 of drum 3 and bearings 9 of drum 7, to determine any damage to bearings 6 and 9. Determining various operating characteristics of cutting unit 1 is useful by enabling control unit 13 to discriminate between variations in characteristic quantity values V caused by actual wear of blades 10 and 11, and those produced by damage to mechanical parts of cutting unit 1.

By way of demonstration of the above principle, tests show the reliability of curve 14 in programming subsequent maintenance to be relatively poor when curve 14 is determined on the basis of a small number of characteristic quantity values V. More specifically, assuming an average maintenance interval of 128 hours (16 shifts of 8 hours each), tests show a subsequent maintenance programming error of about 33% when curve 14 is determined on the basis of characteristic quantity values V recorded over 25% of the average maintenance interval (32 hours), of about 18% when curve 14 is determined on the basis of characteristic quantity values V recorded over 50% of the average maintenance interval (64 hours), of about 16% when curve 14 is determined on the basis of characteristic quantity values V recorded over 75% of the average maintenance interval (96 hours), and of about 6% when curve 14 is determined on the basis of characteristic quantity values V recorded over 90% of the average maintenance interval (115 hours)

Since, therefore, the accuracy with which subsequent maintenance is programmed increases in direct proportion to the time lapse since the previous maintenance work on cutting unit 1, maintenance work on cutting unit 1 is actually only programmed when the time lapse since the previous maintenance work on cutting unit 1 exceeds a given threshold value, which may be fixed or variable. A variable threshold value may be assumed equal to a given fraction (e.g. 75% to 90%) of the time lapse between the last and last but one maintenance work on cutting unit 1.

As stated, the signal from sensors 12 fitted to bearings 9 of drum 7 is used by control unit 13 to determine characteristic quantity value V. In one possible embodiment, as opposed to control unit 13 determining characteristic quantity value V on the basis of the contribution of each pair of one blade 10 and a corresponding blade 11, characteristic quantity value V is determined as the overall value over at least one complete turn of drums 3 and 7. In other words, control unit 13 determines the overall value of characteristic quantity value V generated by at least one complete turn of drums 3 and 7, with no account taken of the individual contributions of the various pairs of blades 10 and corresponding blades 11.

In a preferred embodiment, over one complete turn of drums 3 and 7, control unit 13 determines a corresponding intermediate characteristic quantity value for each pair of one blade 10 and a corresponding blade 11, and characteristic quantity value V is determined as the average of all the intermediate values. The intermediate characteristic quantity values may be compared with one another (or with a constant reference) to determine any inconsistency. That is, if the intermediate value of one pair of blades 10 and 11 differs widely from the other intermediate values, then the blades 10 and 11 in the pair probably need adjusting. To determine a corresponding intermediate characteristic quantity value for each pair of one blade 10 and a corresponding blade 11, the signal from sensors 9 must normally be combined with a signal from at least one angular sensor (not shown), typically an encoder, fitted to drum 3 or 7.

Maintenance work on cutting unit 1 normally comprises adjusting the position of drum 3 with respect to drum 7 to adjust the position of each blade 10 with respect to respective blade 11. In one possible embodiment, when performing maintenance work on cutting unit 1, control unit 13 provides for determining a recommended value by which to adjust the position of drum 3 with respect to drum 7, as a function of curve 14, and in particular as a function of the value of curve 14 at the time maintenance is performed, and of the location of the curve 14 value with respect to the acceptance range.

In a further embodiment not shown, control unit 13 provides for automatic power adjustment of the position of drum 3 with respect to drum 7, as a function of curve 14, and in particular as a function of the value of curve 14 at the time maintenance is performed, and of the location of the curve 14 value with respect to the acceptance range.

The predictive maintenance parameters provided by the predictive maintenance method described above may be used to improve design of cutting unit 1, comprising, non-limitatively, the materials for cutting, and the form or profile or action of the cutting members.

Cutting unit 1 as described above may be used on any type of automatic machine, e.g. an automatic filter assembly machine for manufacturing cigarettes, an automatic food wrapping machine, and in general any automatic machine involving cutting of a strip.

The invention claimed is:

1. A method for predictive maintenance of a cutting unit of an automatic machine during normal operation of the cutting unit; the cutting unit comprising at least one cutting member cooperating cyclically with a counter-member to cut an article fed between the cutting member and the counter-member; the method comprising the steps of:
    a) feeding a succession of articles, normally cut by the cutting unit, between the at least one cutting member and the counter member to cut the articles;
    b) determining, with a given frequency, and during the cutting of the articles, the value (V) of a characteristic quantity of the cutting unit related to contact between the cutting member and the counter-member;
    c) determining a first curve of the characteristic quantity value (V) as a function of time;
    d) extrapolating a future time pattern of the characteristic quantity value (v) using the first curve; and
    e) programming maintenance work on the cutting unit when the first curve is outside a given acceptance range.

2. A method as claimed in claim 1, wherein the characteristic quantity is the energy produced by contact between the cutting member and the counter-member.

3. A method as claimed in claim 2, wherein a time pattern of vibration produced by contact between the cutting member and the counter-member is determined; the energy produced by contact between the cutting member and the counter-member being determined as a function of the vibration produced by contact between the cutting member and the counter-member.

4. A method as claimed in claim 1, wherein the characteristic quantity is the force, stress, pressure, impact, or acceleration, with which the cutting member contacts the counter-member.

5. A method as claimed in claim 1, wherein the characteristic quantity is a measurement of vibration produced by contact between the cutting member and the counter-member.

6. A method as claimed in claim 1, wherein the first curve is an exponential curve.

7. A method as claimed in claim 1, wherein the acceptance range comprises a time-variable lower limit.

8. A method as claimed in claim 7, wherein the lower limit of the acceptance range increases with time.

9. A method as claimed in claim 7, wherein the lower limit of the acceptance range is defined by a second curve.

10. A method as claimed in claim 9, wherein the second curve is an exponential curve.

11. A method as claimed in claim 9, wherein the second curve is determined experimentally as the curve which best interpolates the set of relative minimum points of the characteristic quantity value (V) recorded just before maintenance work on the cutting unit.

12. A method as claimed in claim 1, wherein the acceptance range comprises a time-variable upper limit.

13. A method as claimed in claim 12, wherein the upper limit of the acceptance range increases with time.

14. A method as claimed in claim 12, wherein the upper limit of the acceptance range is defined by a third curve.

15. A method as claimed in claim 14, wherein the third curve is an exponential curve.

16. A method as claimed in claim 14, wherein the third curve is determined experimentally as the curve which best interpolates the set of relative maximum points of the characteristic quantity value (V) recorded just after maintenance work on the cutting unit.

17. A method as claimed in claim 1, wherein the characteristic quantity value (V) is determined during a first time interval and with a frequency given by a second time interval.

18. A method as claimed in claim 17, wherein the first time interval is substantially 10 seconds, and the second time interval is substantially 10 minutes.

19. A method as claimed in claim 1, wherein the first curve is determined using only the characteristic quantity values (V) following previous maintenance work on the cutting unit.

20. A method as claimed in claim 19, wherein performance of maintenance work on the cutting unit is indicated by a step in the pattern of the characteristic quantity values (V).

21. A method as claimed in claim 20, wherein performance of maintenance work on the cutting unit is indicated by a step of a value greater than a given first threshold value in the pattern of the characteristic quantity values (V).

22. A method as claimed in claim 1, wherein maintenance work on the cutting unit is only actually programmed when the time lapse since previous maintenance work on the cutting unit exceeds a given second threshold value.

23. A method as claimed in claim 22, wherein the second threshold value is fixed.

24. A method as claimed in claim 22, wherein the second threshold value is variable.

25. A method as claimed in claim 24, wherein the second threshold value equals a given fraction of the time lapse between the last and last but one maintenance work on the cutting unit.

26. A method as claimed in claim 1, wherein the cutting unit comprises a first drum supporting a number of cutting members; and a second drum cooperating with the first drum and supporting a number of counter-members; each cutting member cooperating, in use, with a respective counter-member.

27. A method as claimed in claim 26, wherein each value (V) of the characteristic quantity is determined as the total value over at least one complete turn of the drums.

28. A method as claimed in claim 26, wherein a corresponding intermediate value of the characteristic quantity is determined for each cutting member during one complete turn of the drums, and the value (V) of the characteristic quantity is determined as the average of all the intermediate values.

29. A method as claimed in claim 28, wherein the intermediate values of the characteristic quantity are compared with one another to determine any inconsistency.

30. A method as claimed in claim 1, wherein the cutting member is defined by a first blade, and the counter-member is defined by a second blade.

31. A method as claimed in claim 30, wherein, in use, the first and second blade slide one alongside the other to make a scissor cut.

32. A method as claimed in claim 30, wherein, in use, the first and second blade cooperate end to end to make a nip-off cut.

33. A method as claimed in claim 1, wherein maintenance work on the cutting unit comprises adjusting the position of the cutting member with respect to the counter-member; a control unit making an automatic power adjustment of the position of the cutting member with respect to the counter-member, as a function of the first curve.

34. A method as claimed in claim 33, wherein the control unit determines the value of the adjustment to the position of the cutting member with respect to the counter-member, as a function of the value of the first curve when performing the maintenance work.

35. A method as claimed in claim 34, wherein the control unit determines the value of the adjustment to the position of the cutting member with respect to the counter-member, as a function of the value of the first curve when performing the maintenance work, and as a function of the location of the value of the first curve with respect to the acceptance range.

36. A method as claimed in claim 1, wherein maintenance work on the cutting unit comprises adjusting the position of the cutting member with respect to the counter-member; when performing maintenance work on the cutting unit, a control unit determining a recommended value of the adjustment to the position of the cutting member with respect to the counter-member as a function of the first curve.

37. A method as claimed in claim 36, wherein the control unit determines the recommended value of the adjustment to the position of the cutting member with respect to the counter-member, as a function of the value of the first curve when performing the maintenance work.

38. A method as claimed in claim 37, wherein the control unit determines the recommended value of the adjustment to the position of the cutting member with respect to the counter-member as a function of the value of the first curve when performing the maintenance work, and as a function of the location of the value of the first curve with respect to the acceptance range.

39. A method as claimed in claim 1, wherein, if the first curve is outside the acceptance range immediately following maintenance work on the cutting unit, this means the cutting member needs changing as opposed to adjusting.

40. A method as claimed in claim 1, wherein, if the first curve is close to the acceptance range immediately following maintenance work on the cutting unit, this means the cutting member needs changing as opposed to adjusting.

41. A method as claimed in claim 40, wherein the acceptance range comprises a lower limit increasing with time and defined by a second curve; if the first curve is close to the second curve immediately following maintenance work on the cutting unit, this means the cutting member needs changing as opposed to adjusting.

42. A method as claimed in claim 1, wherein, in determining the value (V) of the characteristic quantity of the cutting unit, a compensation is made as a function of environmental and operating conditions of the cutting unit.

43. A method as claimed in claim 42, wherein, in determining the value (V) of the characteristic quantity of the cutting unit, a compensation is made as a function of the operating temperature of the cutting unit.

44. A method as claimed in claim 42, wherein, in determining the value (V) of the characteristic quantity of the cutting unit a compensation is made as a function of the operating speed of the cutting unit.

45. A method as claimed in claim 1, comprising a further step of checking various operating characteristics of the cutting unit to determine any damage to the mechanical components of the cutting unit, and so determine whether variations in the values (V) of the characteristic quantity are produced by actual wear of the cutting member or by damage to the mechanical components of the cutting unit.

* * * * *